Patented June 25, 1946

2,402,806

UNITED STATES PATENT OFFICE 2,402,806

INHIBITING POLYMERIZATION OF VINYL COMPOUNDS

John R. Durland, Nitro, W. Va., assignor to Monsanto Chemical Company, St. Louis, Mo., a corporation of Delaware No Drawing. Application March 2, 1944, Serial No. 524,809

18 Claims. (Cl. 260—666.5)

The present invention relates to the stabilization of vinyl compounds and to the stabilized compositions so produced.

It is well known that vinyl compounds as for example vinyl esters, and vinyl aromatic compounds such as styrene, its homologues and analogues, tend to polymerize on standing. In the manufacture of vinyl polymers premature polymerization even to a very slight extent may render the monomer unfit for use since it may seriously affect the properties of the finally polymerized product. For this and other reasons it is essential to prevent premature polymerization and for this purpose it is common practice to add an inhibiting agent to the liquid monomer. An object of this invention is to provide a new and improved class of inhibiting agents.

A further object of the invention is to provide a class of cheap materials which are effective inhibiting agents. A still further object is to provide a class of inhibiting agents which are easily removable from the liquid monomer after which the polymerization reaction can be carried out in a normal manner. Other and further objects will be apparent from the description following.

In accordance with this invention it has been found that N-nitroso amines and p-nitroso diaryl amines effectively inhibit the polymerization of vinyl compounds during storage, shipment and distillation. While certain amines are known to inhibit the polymerization of vinyl compounds, the nitroso amines of this group are more effective than the parent amines from which they are derived. Of the N-nitroso amines those having a nitroso group linked to a nitrogen atom which is in turn linked to at least one aryl group are the most effective and are therefore preferred.

Typical examples of nitroso amines which can be used in the practice of this invention comprise the following: N-nitroso benzyl aniline; N-nitroso dihydro trimethyl quinoline; N-nitroso dihydro trimethyl quinoline polymer; N-nitroso di-β-naphthylamine; N-nitroso diphenylamine; p-nitroso diphenylamine; N-nitroso phenothiazine; N-nitroso-6-phenyl dihydro trimethyl quinoline and N-nitroso phenyl-β-naphthylamine. All of the foregoing compounds have been found to possess marked inhibiting action when incorporated into monomeric styrene. It is to be understood that the above are merely illustrative of the invention and other N-nitroso amines and p-nitroso diaryl amines can be used where convenient or desirable.

The new inhibitors are effective at elevated temperatures as for example 100° C.–200° C. as well as at storage temperatures and effectively prevent polymerization during distillation. They are easily removed during distillation of the vinyl compound and in nowise affect the polymerization of the distilled products. The amount of inhibitor to be used will of course vary according to the particular composition and conditions under which it is to be used but in general proportions within the range of 0.001 to 5% are satisfactory. Often the merest traces are sufficient to prevent polymerization entirely.

Among vinyl monomers which can be preserved by incorporating therein one of the preferred class of inhibitors are vinyl acetate, divinyl benzene, α methyl styrene, p-methyl styrene, ethyl vinyl benzene, vinyl naphthalene, p-chloro styrene and the like.

As specific examples of the invention which illustrate the inhibiting power of the new inhibitors but which are not to be taken as limitative of the invention, a suitable proportion of inhibitor was charged with 25 parts by weight of freshly distilled styrene into screw cap bottles of suitable capacity having the caps lined with tin foil. The samples were then immersed in a boiling water bath for a total of 20 hours. Viscosity tests were then made at 25° C. with a 10 ml. analytical pipette measuring the time of flow from the upper mark to a lower mark just below the bulb. For monomeric styrene the time of flow was 11.5 seconds. The viscosities in the table below are expressed as relative values with monomeric styrene as one. As a further measure of the inhibiting action the polystyrene content was determined by distillation.

| Inhibitor | Proportion by weight | Relative viscosity | Polystyrene, percent |
|---|---|---|---|
| N-nitroso benzyl aniline | 0.5 | 1.02 | 1.5 |
| N-nitroso dihydro trimethyl quinoline | 0.5 | 1.05 | 2.3 |
| p-Nitroso diphenyl amine | 0.5 | 1.02 | 0.8 |
| N-nitroso di-β-naphthylamine | 1.0 | 1.07 | 2.1 |
| N-nitroso diphenyl amine | 1.0 | 1.04 | 2.4 |
| N-nitroso phenothiazine | 1.0 | 1.03 | 1.3 |
| N-nitroso phenyl-β-naphthylamine | 1.0 | 1.02 | 1.5 |

By way of comparison styrene without an inhibitor was too viscous for test after heating for the same length of time.

Storage tests were carried out at approximately 25° C. Freshly distilled styrene was stored in the dark in contact with 25 gauge sheet steel. 0.01% of inhibitor was incorporated into the styrene and samples tested periodically for increase in viscosity. The condition of the styrene showed no change after many months of storage as shown in the table below:

| Inhibitor | Time of storage | Change in viscosity |
| --- | --- | --- |
| None | 2 weeks | Viscous liquid. |
| Do | 6 weeks | Solid. |
| N-nitroso dihydro trimethyl quinoline. | 10 months | No change. |
| N-nitroso phenyl-β-naphthylamine. | do | Do. |
| N-nitroso benzyl aniline | do | Do. |
| N-nitroso-6-phenyl dihydro trimethyl quinoline. | do | No change. |

After ten months of storage the styrene composition containing N-nitroso benzyl aniline showed no change at all but remained a colorless watery liquid. The other inhibited compositions showed slight yellowing. The color was readily removed by distillation. In this connection mention should be made of the fact that if desired, the inhibitors may be employed in proportions sufficient to stabilize the vinyl compound at room temperature, or thereabout, but in proportion insufficient to stabilize the composition at elevated temperature and the stabilizing agent left in the compositions. The compositions can be heated to produe polymeric products without removal of the stabilizing agent. Exceedingly minute quantities of inhibitor are often sufficient for this purpose. For example, p-nitroso diphenyl amine in 0.01% by weight on the styrene is a very effective inhibitor at 100° C. Smaller amounts are satisfactory for inhibition during storage and permit mass thermal polymerization without removal of the inhibitor.

Again, the invention is not limited to the compositions set forth to illustrate the invention. Other polymerizable vinyl compounds can be stabilized with the new inhibitors and other N-nitroso amines and p-nitroso diaryl amines used. The method of adding the inhibitor can be varied widely. This invention is limited solely by the claims attached hereto as part of the present specification.

What is claimed is:

1. A liquid composition comprising a vinyl compound and a proportion of a member of a group consisting of N-nitroso amines and p-nitroso diaryl amines sufficient to inhibit polymerization.

2. A liquid composition comprising a vinyl aromatic compound and a proportion of a member of a group consisting of N-nitroso amines and p-nitroso diaryl amines sufficient to inhibit polymerization.

3. A liquid composition comprising a styrene and a proportion of a member of a group consisting of N-nitroso amines and p-nitroso diaryl amines sufficient to inhibit polymerization.

4. A liquid composition comprising a styrene and a proportion of an N-nitroso amine sufficient to inhibit polymerization.

5. A liquid composition comprising a styrene and a proportion of an N-nitroso amine having at least one aromatic group linked to the amino nitrogen atom in proportion sufficient to inhibit polymerization.

6. A liquid composition comprising a styrene and a proportion of an N-nitroso heterocyclic amine sufficient to inhibit polymerization.

7. A liquid composition comprising styrene and a proportion of N-nitroso dihydro trimethyl quinoline sufficient to inhibit polymerization.

8. A liquid composition comprising styrene and a proportion of N-nitroso benzyl aniline sufficient to inhibit polymerization.

9. A liquid composition comprising styrene and a proportion of p-nitroso diphenyl amine sufficient to inhibit polymerization.

10. The method of preventing polymerization of a liquid composition comprising a vinyl compound which comprises incorporating therein a proportion of a member of a group consisting of N-nitroso amines and p-nitroso diaryl amines sufficient to inhibit polymerization.

11. The method of preventing polymerization of a liquid composition comprising a vinyl aromatic compound which comprises incorporating therein a proportion of a member of a group consisting of N-nitroso amines and p-nitroso diaryl amines sufficient to inhibit polymerization.

12. The method of preventing polymerization of a liquid composition comprising a styrene which comprises incorporating therein a proportion of a member of a group consisting of N-nitroso amines and p-nitroso diaryl amines sufficient to inhibit polymerization.

13. The method of preventing polymerization of a liquid composition comprising a styrene which comprises incorporating therein a proportion of an N-nitroso amine sufficient to inhibit polymerization.

14. The method of preventing polymerization of a liquid composition comprising a styrene which comprises incorporating therein a proportion of an N-nitroso amine having at least one aromatic group linked to the amino nitrogen atom in proportion sufficient to inhibit polymerization.

15. The method of preventing polymerization of a liquid composition comprising a styrene which comprises incorporating therein a proportion of an N-nitroso heterocyclic amine sufficient to inhibit polymerization.

16. The method of preventing polymerization of a liquid composition comprising styrene which comprises incorporating therein a proportion of N-nitroso dihydro trimethyl quinoline sufficient to inhibit polymerization.

17. The method of preventing polymerization of a liquid composition comprising styrene which comprises incorporating therein a proportion of N-nitroso benzyl aniline sufficient to inhibit polymerization.

18. The method of preventing polymerization of a liquid composition comprising styrene which comprises incorporating therein a proportion of p-nitroso diphenyl amine sufficient to inhibit polymerization.

JOHN R. DURLAND.